D. LOWN.
Churn.

No. 83,779.

Patented Nov. 3. 1868.

Witnesses:
Leopold Bueh
A. A. Leatman

Inventor:
David Lown
per
Alexander Mason
Attys.

United States Patent Office.

DAVID LOWN, OF POUGHKEEPSIE, NEW YORK.

Letters Patent No. 83,779, dated November 3, 1868.

IMPROVEMENT IN CHURNS.

The Schedule referred to in these Letters Patent and making part of the same.

*To all whom it may concern:*

Be it known that I, DAVID LOWN, of Poughkeepsie, in the county of Dutchess, and in the State of New York, have invented certain new and useful Improvements in Churn-Dashers; and do hereby declare that the following is a full, clear, and exact description thereof, reference being had to the accompanying drawings, and to the letters of reference marked thereon.

The nature of my invention consists in a cup or air-chamber, placed on the staff above the dasher, which latter may be made in any of the known and usual ways.

In order to enable others skilled in the art to which my invention appertains to make and use the same, I will now proceed to describe its construction and operation, referring to the annexed drawings, which form a part of this specification, and in which—

Figure 1:
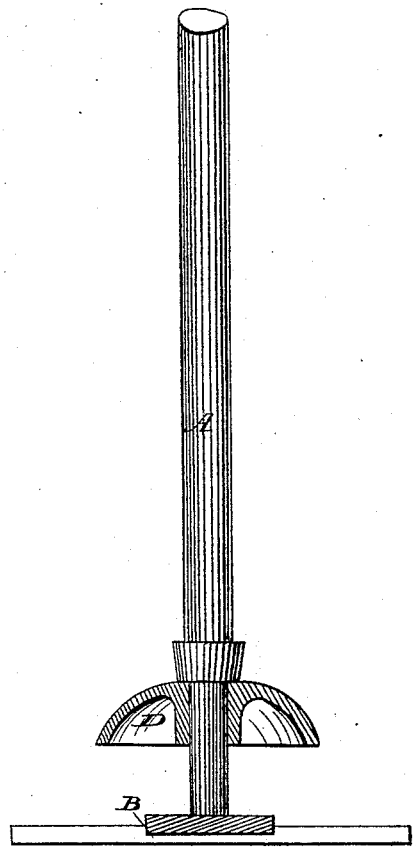
Figure 2:
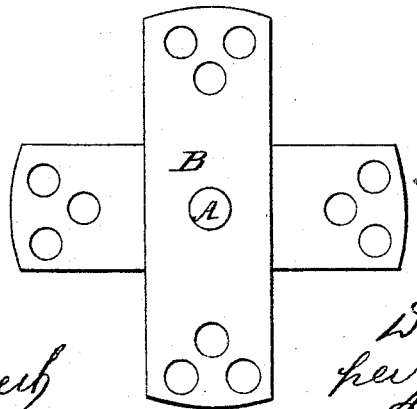

Figure 1 is a side elevation, and
Figure 2, a plan view of the dasher.

A represents the dasher-staff, to the lower end of which the dasher B is secured.

The dasher consists of two bars, laid across each other, and their ends perforated with a number of holes, as seen in fig. 2, or it may be made in any way desired.

On the staff A, and at a suitable distance above the dasher, is placed a cup, D, in inverted position, that is, the concave side down. This cup or air-chamber forces the air in and through the milk, and thereby quickens the process of churning, increases the quantity, and improves the quality of the butter.

The incorporation of the air with the milk is one of the first essentials in making good butter, and this my dasher, constructed as above described, does thoroughly.

The cup D may be made of any material desired.

Having thus fully described my invention,

What I claim as new, and desire to secure by Letters Patent, is—

The combination of the cross-arms B B, perforated near their outer ends, with the cup D, secured under the shoulder on the shaft A, as and for the purposes set forth.

In testimony that I claim the foregoing, I have hereunto set my hand, this 5th day of August, 1868.

DAVID LOWN.

Witnesses:
FRANK B. LOWN,
ROBERT H. SOUTHARD.